United States Patent [19]
Fehlig et al.

[11] Patent Number: 5,826,753
[45] Date of Patent: Oct. 27, 1998

[54] GREASE GUN LOCKING MECHANISM

[75] Inventors: Kenneth L. Fehlig, Chesterfield; Kurt M. Pfitzinger, Ballwin, both of Mo.

[73] Assignee: McNeil (OHIO) Corporation, St. Paul, Minn.

[21] Appl. No.: 964,449

[22] Filed: Nov. 4, 1997

[51] Int. Cl.[6] ................................................. B67B 5/00
[52] U.S. Cl. ................ 222/153.13; 222/260; 184/105.2
[58] Field of Search .................................. 184/28, 105.2; 222/153.13, 256, 260

[56] References Cited

U.S. PATENT DOCUMENTS

| | | |
|---|---|---|
| D. 105,569 | 8/1937 | Butler . |
| 940,572 | 11/1909 | Agner . |
| 1,594,200 | 7/1926 | Hill . |
| 1,619,126 | 3/1927 | Hundemer .............................. 222/256 |
| 1,672,980 | 6/1928 | Hawkins . |
| 1,679,855 | 8/1928 | Davis . |
| 1,690,058 | 10/1928 | Davis . |
| 1,690,221 | 11/1928 | Fesler . |
| 1,709,592 | 4/1929 | Pepper . |
| 1,715,329 | 5/1929 | Prescott . |
| 1,804,582 | 5/1931 | Woodruff ............................... 222/256 |
| 1,993,021 | 3/1935 | Slaten . |
| 2,116,005 | 5/1938 | Tear et al. . |
| 2,439,566 | 4/1948 | Gamache ........................ 222/153.13 X |
| 2,792,154 | 5/1957 | L'heureux . |
| 3,414,170 | 12/1968 | Sundholm . |
| 4,159,067 | 6/1979 | Akers . |
| 4,432,483 | 2/1984 | Kuck . |
| 4,506,805 | 3/1985 | Marcon ........................ 222/153.13 X |
| 4,664,298 | 5/1987 | Shew . |
| 5,046,642 | 9/1991 | Cathcart, Sr. et al. . |
| 5,108,011 | 4/1992 | Kobayashi et al. . |
| 5,199,614 | 4/1993 | Husman . |
| 5,246,144 | 9/1993 | Cathcart, Sr. et al. . |
| 5,277,339 | 1/1994 | Shew et al. . |

*Primary Examiner*—Gregory L. Huson
*Attorney, Agent, or Firm*—Howell & Haferkamp, L.C.

[57] ABSTRACT

In a grease gun having a handle that is manually manipulated from a position extending along the side of the grease gun body to a position oriented at an angle relative to the body to charge the pump of the grease gun with lubricant or some other liquid contained in the gun, and then is moved from the angled orientation relative to the grease gun body to a discharge position or back to the position where the lever handle extends along the side of the grease gun body to operate the pump to discharge the lubricant or liquid, a lock mechanism locks the lever handle in its discharge position extending along the side of the grease gun body preventing it from being moved to its charge position.

18 Claims, 3 Drawing Sheets

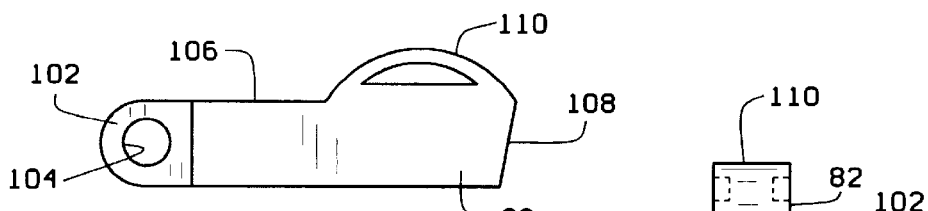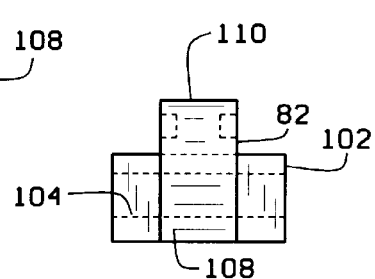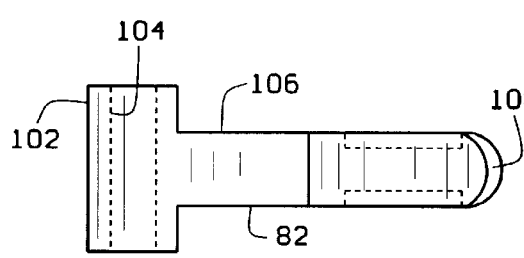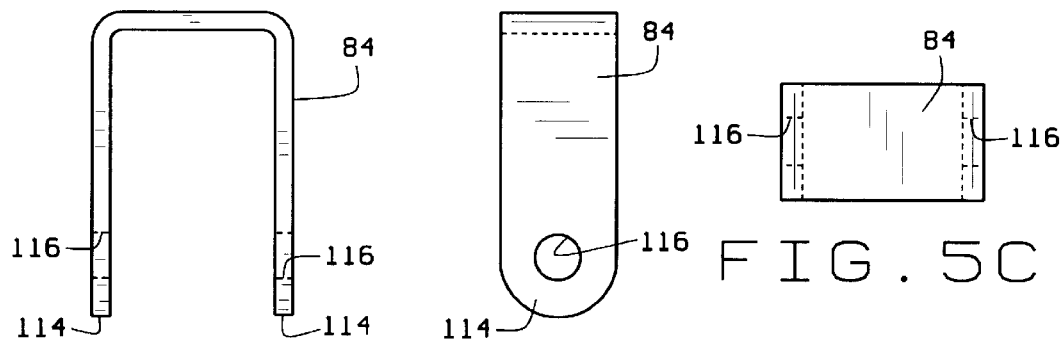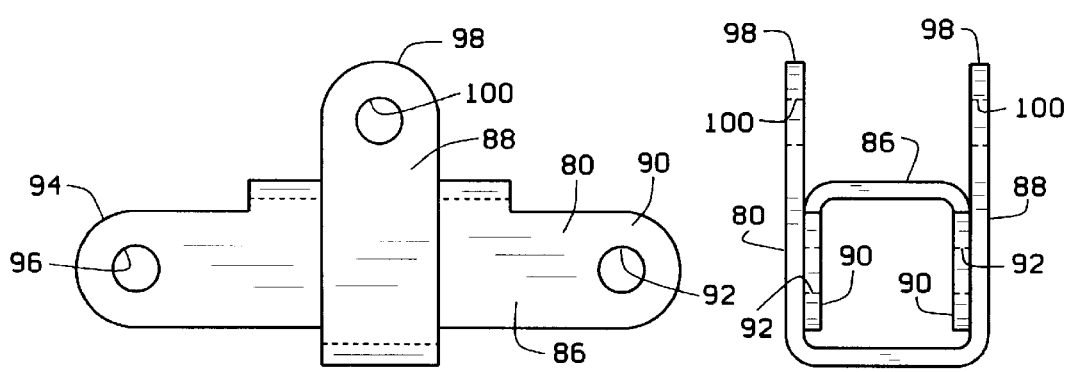

GREASE GUN LOCKING MECHANISM

BACKGROUND OF THE INVENTION (1) Field of the Invention

The present invention pertains to a locking mechanism that keeps the lever handle of a grease gun in its discharge position or its position along the body of the grease gun when not in use. More specifically, in a grease gun having a handle that is manually manipulated from a position extending along the side of the grease gun body to a position oriented at an angle relative to the body to charge the pump of the grease gun with lubricant or some other liquid contained in the gun, and then is moved from the angled orientation relative to the grease gun body to a discharge position or back to the position where the lever handle extends along the side of the grease gun body to operate the pump to discharge the lubricant or liquid, the lock mechanism of the invention locks the lever handle in its discharge position extending along the side of the grease gun body preventing it from being moved to its charge position.

(2) Description of the Related Art

Manually operated grease guns commonly comprise a pump head containing a manually operated piston pump. A discharge spout extends from an outlet opening in the pump head and an input opening in the pump head communicates with the piston pump. A tubular lubricant supply chamber having a supply of lubricant or other liquid in its interior is removeably attached to the pump head with its interior communicating with the input opening of the pump head. The discharge spout commonly has a nozzle fitting at its distal end for dispensing lubricant pumped from the pump head. The pump is operated by a manual lever handle pivotally connected to the pump head. Manipulating the lever handle operates the pump contained in the pump head and dispenses lubricant or some other liquid contained in the interior of the chamber of the gun through the discharge spout.

FIG. 1 shows one example of the construction of a prior art grease gun. It should be understood that while the grease gun is usually employed to dispense grease at high pressure, the gun could also be employed to dispense other types of liquids. Therefore, the gun will be described as dispensing a liquid with the intent being that this description will cover all possible uses of the grease gun.

A typical prior art grease gun as that shown in FIG. 1 is comprised of a body 10 including a pump head 12, a tubular reservoir chamber 14, a discharge spout 16 and a manual handle 18.

The pump head 12 contains a cylindrical pump chamber 20 that receives a pump rod 22 for sliding movement therein. The top end of the pump rod 22 extends out of the pump chamber 20 and is connected to the handle 18 by a pivot pin 24. A cylindrical collar 26 is provided on the pump head. The collar 26 has internal screw threading 28 for removable attachment of the reservoir chamber 14 thereto. The collar 26 surrounds an input opening 30 in the pump head that communicates with the pump chamber 20. On an opposite side of the pump head from the input opening 30 is an output opening 32 that also communicates with the pump chamber 20. The output opening 32 has internal screw threading 34. External screw threading 36 on the discharge spout 16 secures the spout in the output opening. Additional internal threading 38 is provided at the bottom of the pump chamber 20 and a valve plug 40 is screw threaded into this internal threading. The valve plug 40 supports a coil spring 42 and a ball valve 44 in the bottom of the pump chamber 20 with the spring 42 biasing the ball valve 44 against a valve seat 46 (shown in FIGS. 2 and 3).

The reservoir chamber 14 has an open forward end 48 having external screw threading 50 thereon that mates with the internal threading 28 of the pump head collar 26, thereby removably attaching the chamber 14 to the pump head 12. A cap 52 is secured over the rearward end of the chamber. An open tube 54 extends rearwardly from the cap.

A spring biased piston mechanism is contained inside the reservoir chamber 14. The mechanism includes a pull handle 56 outside the chamber adjacent the rearward end. A pull rod 58 is connected to the handle 56 and extends through the tube 54 of the rearward end cap into the chamber interior to a piston assembly 60 at the forward end of the rod. The piston assembly 60 holds a flexible, circular sealing disc 62 in sliding engagement with the interior cylindrical wall of the reservoir chamber 14. A large coil spring 64 engages against the rearward face of the piston assembly 60 and the interior surface of the end cap 52 and biases the piston assembly 60 to the left as viewed in FIG. 1.

The manual handle 18 has a length that extends substantially the entire length of the grease gun body 10 and has an inverted U-shaped cross-section. The topmost end of the pump rod 22 extends into the handle inside its inverted U-shaped cross-section. The pivot pin 24 connects the handle to the top of the pump rod 22 for pivoting movement of the handle relative thereto. The connection of the pump rod 22 divides the length of the handle into a first, forward section 66 and a second, rearward section 68 that is substantially longer than the forward section 66.

A link 70, which also has a U-shaped cross-section, is connected between the handle first section 66 and a projecting hub 72 of the pump head 12. The top end of the link 70 is connected to the handle forward section 66 by a pivot pin 74 and the bottom end of the link is connected to the pump head hub 72 by a pivot pin 76.

In use of the prior art grease gun of FIG. 1, the reservoir chamber 14 is first removed from the pump head 12. The open forward end 48 of the chamber is then inserted into a supply of grease and the pull handle 56 is pulled rearwardly from the chamber 14 causing the piston assembly 60 to move toward the chamber rearward cap 52. This creates a suction in the interior of the chamber drawing lubricant from the supply into the interior. Alternatively, there are known lubricant cartridges in the prior art that can be inserted into the interior of the chamber 14 once the piston assembly 60 is retracted.

After the chamber is filled, it is reattached to the pump head 12. The bias of the coil spring 64 against the piston assembly 60 creates a pressure in the lubricant filling the chamber forcing lubricant into the pump head input opening 30. However, flow of the lubricant to the pump head is blocked by the pump rod 22 in the position shown in FIG. 1. To dispense lubricant, the handle 18 is gripped at its rearward section 68 and pulled in a direction away from the grease gun body 10. This causes the handle to pivot about the pivot pin 76 at the upper end of the link 70, which in turn causes the handle to pull the pump rod 22 from the pump chamber 20. When the handle 18 is pulled to its furthest extent away from the grease gun body 10, it is in its charge position relative to the grease gun body where the pump rod 22 is removed from the input opening 30 allowing grease to fill this opening and the portion of the pump chamber 20 below the opening and above the ball valve 44. On the return stroke of the manual handle 18 toward the grease gun body 10, the pump rod 22 travels downwardly through the pump chamber 20 bypassing and closing off the input opening 30. On continued downward movement of the pump rod 22 it increases the pressure of the grease in the pump chamber 20 between the input opening 30 and the ball valve 44. The increase in pressure unseats the ball valve 44 allowing the grease in the pump chamber 20 below the input opening 30 to be forced past the ball valve 44 and out through the discharge spout 16. This movement of the manual handle 18 dispensing the grease from the pump chamber 20 continues until the handle is returned to its discharge position relative to the grease gun body 10 shown in FIG. 10. The sequence of handle movements is then repeated to continue dispensing grease from the reservoir chamber 14 through the pump head 12 and out through the discharge spout 16.

Grease guns such as that shown in FIG. 1 are often carried by their manual handle 18. When picking up the grease gun to move it from one location to another, because the user is accustomed to manually manipulating the handle 18, the handle is often grabbed first instead of the reservoir chamber 14 or some other portion of the grease gun. When a user picks up the grease gun by the manual handle 18, the weight of the reservoir chamber 14 and pump head 12 will cause the handle 18 and reservoir chamber 14 to move relative to each other until the handle is in its charge position relative to the reservoir chamber. This in turn causes the piston assembly 60 to force a supply of grease from the reservoir chamber 14 into the input opening 30 and the portion of the pump chamber 20 below the input opening and above the ball valve 44 as described above. When the grease gun has been transported to it desired location by the user, the user will often move the handle 18 back to its discharge position shown in FIG. 1 before placing the grease gun down. This causes an inadvertent discharge of grease from the discharge spout 16. This unintended discharge of grease will at times come into contact with surfaces or objects. This results in not only the soiling of the surface or object contacted by the unintended discharge of grease, but it also wastes that portion of grease discharged. What is needed to overcome this problem is a mechanism that would hold the manual lever 18 in its discharge position along side the body 10 of the grease gun and thereby prevent its unintended movement to its charge position relative to the grease gun body when the grease gun is transported by the handle.

SUMMARY OF THE INVENTION

The present invention provides a lock mechanism that may be provided on prior art grease guns when they are manufactured or may be retrofit to existing grease guns. The lock mechanism is easily manually operated to hold the grease gun handle in its discharge position along side the body of the grease gun and thereby prevent the unintended movement of the handle to its charge position relative to the grease gun body when the grease gun is transported or carried by the handle.

The lock mechanism of the present invention is basically comprised of three parts including a toggle having an arm, a pawl and a clip. The toggle is attached to the prior art grease gun in place of the link extending between the pump head and the handle. The arm of the toggle projects forwardly and supports the pawl for pivoting movement thereon. The pawl is dimensioned to pivot relative to the arm and the pump head to a lock position relative to the handle where it engages inside the U-shaped configuration of the handle first section. In this position of the pawl, it engages against a stop surface of the handle preventing the handle first section from pivoting downwardly toward the pump head in response to the handle second section being moved away from the grease gun body toward the charge position of the handle. In this manner, the engagement of the pawl against the stop surface holds the handle in its discharge position extending along the length of the grease gun body and prevents the handle from moving to its charge position.

A U-shaped clip is pivotally connected to the upper end of the toggle for movement between hold and release positions relative to the pump head. In the hold position of the clip it engages over the pawl when the pawl is moved to its lock position and holds the pawl in the recess of the handle first section preventing the pawl from being moved to its unlock position. When the clip is moved to its release position, it is displaced from the pawl and the pawl may then be moved from its locked position to an unlock position of the pawl where it is displaced from the first section of the handle. With the pawl moved to its unlock position, the handle may be freely manipulated between its charge and discharge positions relative to the grease gun to dispense grease from the gun.

The toggle of the lock mechanism has the same dimensions as the link of the prior art grease gun and can easily replace the link of the prior art grease gun to retrofit the lock mechanism of the invention to an existing grease gun or to add the lock mechanism to a grease gun being manufactured.

BRIEF DESCRIPTION OF THE DRAWINGS

Further objects and features of the present invention are revealed in the following detailed description of the preferred embodiment of the invention and in the drawing figures wherein:

FIGS. 4A through 4C are various views of the pawl of the lock mechanism;

FIGS. 5A through 5C are various views of the clip of the lock mechanism; and

FIGS. 6A and 6B are views of the toggle of the lock mechanism.

DESCRIPTION OF THE PREFERRED EMBODIMENT

The lock mechanism of the invention will be described as employed on a prior art grease gun of the construction shown in FIG. 1. However, there are various types of grease guns in the prior art that employ constructions similar to that shown in FIG. 1 without being strictly identical to that construction. It is intended that the description of the lock mechanism of the invention as employed with the grease gun of FIG. 1 be illustrative only with it being understood that the lock mechanism of the invention may be employed with grease guns having similar, but different constructions from that shown in FIG. 1.

Figure 1:
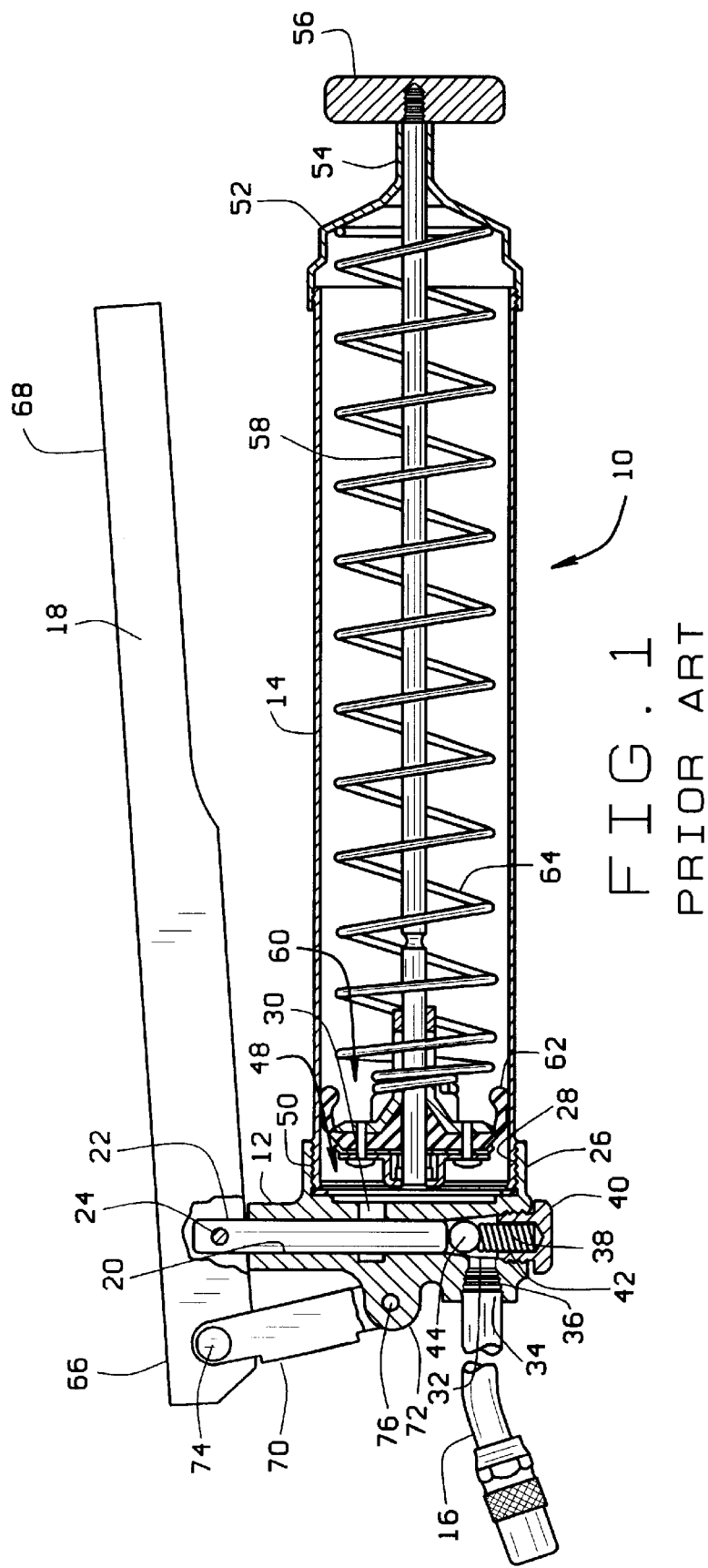
FIG. 1 is a side elevation view, partially in section, of a prior art grease gun.

The lock mechanism of the invention is basically comprised of a toggle 80, a pawl 82, and clip 84 that are assembled to a prior art grease gun such as that shown in FIG. 1 in place of the link 70 of the prior art construction. By replacing the link 70 with the lock mechanism of the invention the operation of the grease gun is not affected. However, the lock mechanism adds the ability to lock the manual handle 18 in its discharge position relative to the grease gun body 10 shown in FIG. 1, enabling the grease gun to be carried by the handle without the handle moving relative to the grease gun body.

A side view of the toggle 80 is shown in FIG. 6A and an end view of the toggle is shown in FIG. 6B. The toggle 80 is comprised of a link 86 and an arm 88. The toggle link 86 is substantially identical to the link 70 of the prior art grease gun. It is preferably constructed of metal that is bent over in a U-shape giving the toggle a U-shaped configuration as seen in FIG. 6B. A pair of spaced bars 90 project from one end of the toggle link and have aligned holes 92 passing therethrough. A second pair of spaced bars 94 project from the opposite end of the toggle link and also have a pair of holes 96 passing therethrough.

The toggle arm 88 is also bent over in a U-shape giving it a U-shaped cross-section as shown in FIG. 6B. The toggle arm 88 extends around the toggle link 86 and spaced ends 98 of the toggle arm project beyond a side of the toggle link. Aligned holes 100 pass through the spaced ends 98 of the toggle arm. The toggle arm 88 is secured to the toggle link 86 in the relative position shown in FIG. 6A by welding or other equivalent methods.

The toggle 80 is secured between the first section 66 of the handle and the pump head hub 72 by pivot pins 74, 76 in the same manner as the previously described link 70. The positioning of the toggle 80 relative to the pump head 12 and the manual handle 18 is shown in FIGS. 2 and 3.

The construction of the pawl 82 is shown in FIGS. 4A through 4C. The pawl includes a hub 102 having a hole 104 passing therethrough. The hub 102 has an axial length slightly smaller than the spacing between the ends 98 of the toggle arm to enable the hub to be received between the toggle arm ends for pivoting movement therein. A post 106 projects from the hub 102 to a contact surface 108 at the distal end of the post. An arched handle 110 is formed in one side of the post to facilitate gripping the post in use. The pawl 82 is connected to the toggle 80 by a pivot pin 112 that passes through the holes 100 in the ends of the toggle arms and through the hole 104 through the pawl hub 102. This connection enables the pawl 82 to pivot between lock and unlock positions relative to the toggle 80 and the pump head 12 as will be explained. The pawl 82, through its pivot pin 112 connection to the toggle 80, is operatively connected to the pump head 12 by the connection of the toggle 80 to the pump head 12 by its pivot pin 76 at the bottom of the toggle. The pawl 82 is also preferably constructed of metal.

The clip 84 is shown in FIGS. 5A through 5C. The clip 84, like the toggle arm 88, is constructed of a strip of metal that is bent over in a U-shaped configuration with a spacing between ends 114 of the clip. Aligned holes 116 pass through the clip ends. The spacing between the clip ends 114 is sufficiently large to receive the pair of toggle link bars 90 therebetween and permit the clip to pivot freely relative to the toggle 80. As shown in FIGS. 2 and 3, the clip 84 is secured to the top end of the toggle 80 by a pivot pin 74 passing through the holes 116 in the clip ends 114 and the holes 92 in the toggle link bars 90. By the connection provided by the pivot pin 74, the clip 84 is connected to the handle first section 66 and to the toggle 80 for pivoting movement relative thereto, and by the toggle 80 the clip 84 is operatively connected to the pump head 12.

Figure 3:
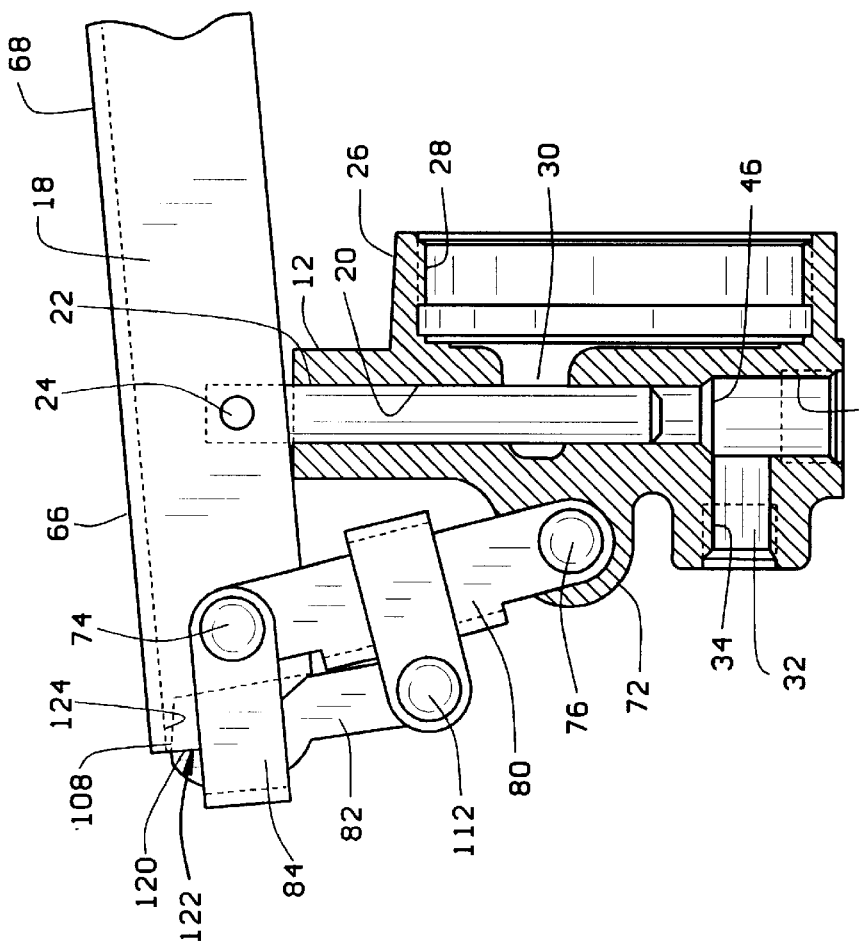
FIG. 3 is a view similar to that FIG. 2 with the manual handle moved to its discharge position relative to the pump head.
Figure 2:
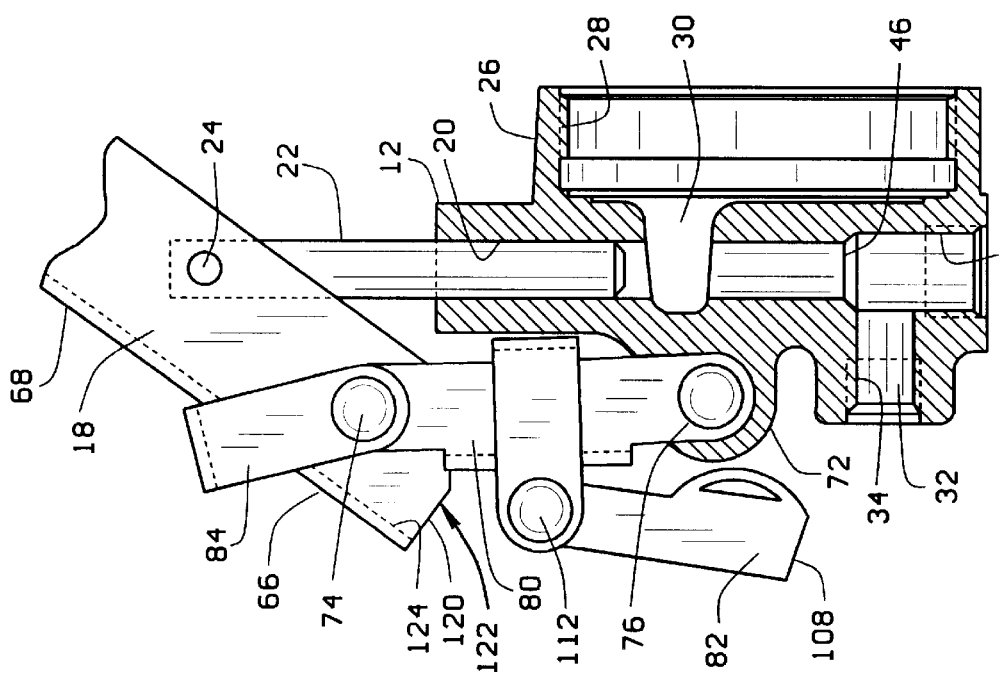
FIG. 2 is a side elevation view, partially in section, of the pump head of a prior art grease gun to which the lock mechanism of the invention has been added.

Referring to FIGS. 2 and 3, operation of the lock mechanism of the invention is illustrated. FIGS. 2 and 3 show the pump head 12 of the prior art grease gun with the reservoir chamber 14, the discharge spout 16, the valve plug 40 and its spring 42 and ball valve 44 removed for clarity. FIG. 2 shows the lock mechanism of the present invention in its unlock position. In FIG. 2 the clip 84 is displaced from the pawl 82 and the pawl 82 is displaced from the distal end 120 of the handle first section 66. In the relative positions of the clip 84 and the pawl 82 relative to the pump head 12, the handle 18 is free to move between its charge and discharge positions to reciprocate the pump rod 22 through the pump chamber 20 in operation of the grease gun as described earlier.

When it is desired to lock the lock mechanism of the invention, the manual handle 18 is moved to its discharge position relative to the pump head 12 as shown in FIG. 3. With the handle so positioned the pawl 82 is then pivoted upwardly from its unlock position shown in FIG. 2 to its lock position shown in FIG. 3. In the lock position of the pawl 82 it is received in a recess 122 formed by the inverted U-shaped cross-section configuration of the handle first section 66. The contact surface 108 of the pawl engages against a stop surface 124 on the interior of the handle first section. The clip 84 is then moved from its release position shown in FIG. 2 to its hold position shown in FIG. 3 to hold the pawl in its lock position. With the pawl 82 received in the handle recess 122 and its contact surface 108 engaging against the handle stop surface 124, the first section 66 of the handle is prevented by the pawl from moving toward the pump head 12 in response to the handle second section 68 being manually moved away from the body 10 of the grease gun. In this manner, the lock mechanism of the invention holds the handle 18 in its discharge position relative to the grease gun body 10 while the grease gun is being carried from the handle.

In order to unlock the lock mechanism to manipulate the handle 18 between its charge and discharge positions, the clip 84 is first pivoted upwardly as viewed in FIG. 3 to its release position relative to the pawl 82 and the pump head 12 shown in FIG. 2. The pawl 82 is then gripped by its handle 110 and pivoted out of the recess 122 and away from the handle distal end 120 to its unlock position shown in FIG. 2. With both the clip 84 in its release position and the pawl 82 in its unlock position, both shown in FIG. 2, the handle 18 is free to be manually manipulated between its charge and discharge positions relative to the grease gun body 10.

While the present invention has been described by reference to a specific embodiment, it should be understood that modifications and variations of the invention may be constructed without departing from the scope of the invention defined in the following claims.

What is claimed:

1. A liquid dispenser comprising:

a body having a discharge spout, an interior chamber for containing a supply of liquid, a pump that is operated to pump liquid in the interior chamber out of the body through the discharge spout, and a handle mounted to the pump that is movable between charge and discharge positions of the handle relative to the body to operate the pump;

a lock mechanism mounted on the body for movement between a lock position and an unlock position of the lock mechanism relative to the body, where in the lock position the lock mechanism prevents the handle from moving to its charge position relative to the body and in the unlock position the lock mechanism permits the handle to move to its charge position relative to the body;

the pump has a pump rod that projects from the body and the handle is mounted to the pump rod intermediate first and second sections of the handle;

the lock mechanism engages the handle first section when the lock mechanism is in its lock position; and the handle first section has a length and the handle second section has a length that is longer than the length of the handle first section.

2. The liquid dispenser of claim 1, wherein:

the handle is mounted to the pump rod by a pivot connection that causes the handle first section to move toward the body in response to the handle second section moving away from the body and causes the handle first section to move away from the body in response to the handle second section moving toward the body; and the lock mechanism engages with the handle first section when the lock mechanism is in its lock position and the handle first section is moved toward the body, thereby preventing the handle second section from being moved away from the body.

3. The liquid dispenser of claim 2, wherein:

the handle first section has a stop surface that faces toward the body and the lock mechanism includes a pawl that is operatively connected to the body for movement of the pawl between lock and unlock positions of the pawl relative to the body, where in the lock position of the pawl it engages with the stop surface of the handle first section preventing the handle second section from being moved away from the body, and in the unlock position of the pawl it is displaced from the stop surface of the handle first section and permits the handle second section to be moved away from the body.

4. The liquid dispenser of claim 3, wherein:

the lock mechanism also includes a clip that is operatively connected to the body for movement of the clip between hold and release positions of the clip relative to the body, where in the hold position the clip engages with the pawl when the pawl is in its lock position and the clip prevents the pawl from moving from its lock position to its unlock position, and in the release position of the clip the clip is displaced from the pawl and permits the pawl to move freely between its lock and unlock positions.

5. The liquid dispenser of claim 1, wherein:

a toggle is connected between the body and the handle first section and the lock mechanism engages the handle first section on an opposite side of the toggle from the handle second section.

6. A liquid dispenser comprising:

a chamber for containing a liquid;

a pump head connected to the chamber, the pump head having an output opening, an input opening, and a pump that is operable to receive liquid from the chamber through the input opening and to dispense liquid from the pump head through the output opening;

a handle connected to the pump head for movement of the handle away from the pump head to a charge position of the handle where the handle operates the pump to receive liquid from the body through the input opening, and for movement of the handle toward the pump head to a discharge position of the handle where the handle operates the pump to discharge liquid from the pump head through the output opening; and, a lock mechanism mounted on the pump head for movement between a lock position where the lock mechanism engages against the handle and prevents the handle from moving to its charge position, and an unlock position where the lock mechanism is disengaged from the handle and the handle is free to move to its charge position.

7. The liquid dispenser of claim 6, wherein:

the handle is connected to the pump intermediate first and second sections of the handle, the handle second section moves between the charge and discharge positions and the handle first section moves toward and away from the pump head, respectively, in response to the hand second section moving between the charge and discharge position; and, the lock mechanism includes a pawl operatively mounted on the pump head for movement of the pawl between a lock position and an unlock position where in the lock position of the pawl it engages with the handle first section and prevents the handle first section from moving toward the pump head and thereby prevents the handle second section from moving to its charge position, and in the unlock position of the pawl it is displaced from the handle first section and thereby permits the handle second section to move between its charge and discharge positions.

8. The liquid dispenser of claim 7, wherein:

the pump includes a pump rod that extends from the pump head and the handle is connected to the pump rod intermediate the first and second sections of the handle.

9. The liquid dispenser of claim 7, wherein:

the handle first section has a stop surface that faces the pump head and the pawl engages against the stop surface when the pawl is in its lock position.

10. The liquid dispenser of claim 7, wherein:

the handle first section has a distal end with a recess therein, and the pawl seats inside the recess when the pawl is in its lock position.

11. A liquid dispenser of claim 10, wherein:

the lock mechanism also includes a clip operatively mounted on the pump head for movement of the clip between hold and release positions of the clip relative to the pump head where in the hold position of the clip with the pawl seated inside the recess at the distal end of the handle first section the clip engages over the pawl and prevents the pawl from moving from the recess.

12. The liquid dispenser of claim 7, wherein:

the lock mechanism also includes a clip operatively mounted on the pump head for movement of the clip between hold and release positions of the clip relative to the pump head where in the hold position of the clip with the pawl moved to its lock position the clip will engage the pawl and prevent the pawl from moving from its lock position to its unlock position, and in the release position of the clip it is displaced from the pawl and permits the pawl to move freely between its lock and unlock positions.

13. The liquid dispenser of claim 12, wherein:

a toggle is connected between the pump head and the handle first section and the pawl is connected to the toggle and thereby connected to the pump head.

14. A lock mechanism for a liquid dispenser having a pump head with an input opening and an output opening and containing a pump, the pump having a pump rod projecting from the pump head, a handle connected to the pump rod intermediate first and second sections of the handle and a toggle connected between the pump head and the handle first section, the handle being movable between charge and discharge positions of the handle relative to the pump head to operate the pump, the lock mechanism comprising:

a pawl operatively connected to the pump head for movement of the pawl between a lock position and an unlock position of the pawl relative to the pump head where in the lock position of the pawl it will engage with the handle first section and prevent the handle from being moved to its charge position and in the unlock position of the pawl it is displaced from the handle first section and permits the handle to moved between its charge and discharge positions.

15. The lock mechanism of claim 14, wherein:

the handle first section has a stop surface that faces toward the pump head and the pawl engages against the stop surface when the pawl is moved to its lock position.

16. The lock mechanism of claim 15, wherein:

a clip is operatively mounted on the pump head for movement of the clip between hold and release positions of the clip relative to the pump head where the clip in its hold position engages with the pawl when the pawl is moved to its lock position in engagement with the stop surface, and the clip in its release position is displaced from the pawl permitting the pawl to move between its lock and unlock positions.

17. The lock mechanism of claim 14, wherein:

the handle first section has a distal end with a recess formed therein and the pawl seats in the recess when the pawl is moved to its lock position.

18. The lock mechanism of claim 17, wherein:

a clip is operatively mounted on the pump head for movement of the clip between hold and release positions of the clip relative to the pump head where the clip in its hold position engages with the pawl when the pawl is moved to its lock position seated in the recess in the handle first section, and the clip in its release position is displaced from the pawl permitting the pawl to move between its lock and unlock positions.

* * * * *